United States Patent [19]
Klink

[11] 4,206,824
[45] Jun. 10, 1980

[54] CENTRIFUGAL CLUTCH

[75] Inventor: Rainer Klink, Kernen, Fed. Rep. of Germany

[73] Assignee: Deutsche Automobilgesellschaft mbH., Hanover, Fed. Rep. of Germany

[21] Appl. No.: 946,650

[22] Filed: Sep. 28, 1978

[30] Foreign Application Priority Data

Sep. 28, 1977 [DE] Fed. Rep. of Germany ....... 2743595

[51] Int. Cl.$^2$ .............................................. B60K 17/10
[52] U.S. Cl. .................................. 180/65 R; 192/3.31; 192/103 A
[58] Field of Search ............. 180/65 R, 70 R; 60/345, 60/346; 192/3.28, 3.31, 103 A, 105 CP, 105 CS

[56] References Cited
U.S. PATENT DOCUMENTS

| | | | |
|---|---|---|---|
| 2,640,572 | 6/1953 | O'Brien | 60/345 X |
| 4,042,083 | 8/1977 | Schulz | 192/3.31 |
| 4,113,075 | 9/1978 | Walker | 192/3.31 |

*Primary Examiner*—John A. Pekar
*Attorney, Agent, or Firm*—Craig & Antonelli

[57] ABSTRACT

A centrifugal clutch which includes two clutch halves and at least one centrifugal weight, which is lockable to one of the clutch halves in a free-wheel position by way of springs so as to permit relative rotation between the clutch halves. At least one driver is provided in one of the clutch halves for driving the at least one centrifugal weight in two rotational directions about an axis of rotation of the centrifugal clutch. The centrifugal weight is displaceable, upon overcoming a pretensioning force of the springs, under the influence of a centrifugal force so as to move from the free-wheel position to an engaged position. In the free-wheel position, the at least one centrifugal weight has a predetermined play in the two rotational directions relative to the driver. The centrifugal weight is displaceable into intermediate positions in which a torque-transmitting connection is established between the clutch halves by way of a frictional contact with the springs being mounted on the centrifugal weight so as to exclusively hold the clutch halves in contact, in the intermediate position, independently of the driver.

32 Claims, 10 Drawing Figures

CENTRIFUGAL CLUTCH

The present invention relates to a clutch construction and, more particularly, to a centrifugal clutch which includes at least one centrifugal weight which is lockable by a spring means to one clutch half in a free-wheel position so as to permit relative rotation of both clutch halves with the weight being drivable by at least one driver of the clutch half in the rotational direction of the clutch axis and with the centrifugal weight being displaceable, upon overcoming a pretensioning force of the spring means under the influence of centrifugal forces, moving from the free-wheel position to an engaged position wherein the weight is both in mesh with the driver and in frictional contact with the other clutch half.

A centrifugal clutch of the aforementioned type has been proposed in, for example, German Pat. No. 1,160,257 wherein radially disposed pot-shaped drive shells are rigidly fastened to the corresponding clutch half with their open ends facing the clutch axis. The drive shells positively engage cylindrical recesses in the centrifugal weights whereby the recess and coupling shell are traversed coaxially by an anchor bolt fastened to the centrifugal weight. A coil spring, disposed concentrically between the drive shell and anchor bolt, abuts a bottom of the drive shell with a radially outer end and abuts a thrust bearing of the anchor bolt with a radially inner end. In such a construction, the coil springs do not participate in the torque transfer and the drive shells are in constant positive mesh with the centrifugal weights.

In Offenlegungsscrift No. 24 18 697, a centrifugal clutch is provided wherein at least one centrifugal weight is held by a spring means against one clutch half in a free-wheel position which permits mutual relative rotation of both clutch halves. The weight has at least one engagement surface cooperating with a corresponding engagement surface associated with this clutch half to derive a servo-force component at right angles to the rotational axis from the torque of this clutch half. The centrifugal weight, held in a free-wheel position by the spring means, upon overcoming a pretensioning force of the spring means under the influence of the centrifugal force, is displaceable into an engaged position in which both the engagement surfaces for the servo-force components are engaged with one another and the centrifugal weight is brought into frictional contact with the other clutch half.

In the last-mentioned clutch construction, play in the rotational direction, which occurs in this centrifugal clutch when the centrifugal weight is in the free-wheel position, is provided between the drive shell and the centrifugal weight. However, this play cannot prevent the abrupt and/or sharp initiation of frictional contact when the engagement rpm is exceeded because it is bridged by a cam which is held and driven by the clutch half supporting the centrifugal weight in the free-wheel position against the engagement surface of the centrifugal weight for the servo-force component normal to the axis of rotation with the cam providing immediate torque support for the compressive force exerted by the centrifugal weight.

Moreover, in the last-mentioned centrifugal clutch, the play between the centrifugal weight and drive shell, cooperating with a torque-limiting spring disposed between the cam and the clutch half supporting the centrifugal weight, serves to disconnect the cam from the centrifugal weight above a certain torque so that the normal force of the centrifugal weight, which produces the frictional connection, is only just proportional to the centrifugal force.

To determine the engagement speed or rpm at which the centrifugal weight is designed to come into frictional contact with the other clutch half, the coil springs are subjected to a pretensioning force and adjusted to the mass of the centrifugal weight to maintain the centrifugal weight in the free-wheel position at rpm values below the engagement rpm. However, there is a danger that the positive engagement of the drive shell on the centrifugal weight will result in an abrupt engagement of the centrifugal weight with the other half of the clutch when the engagement rpm is exceeded, especially if the engagement rpm is relatively high. Likewise, shocks caused by the drive shell can occur abruptly with a change in torque, that is, when one clutch half is changing relative to the other between an acceleration phase and a deceleration phase.

The aim underlying the present invention essentially resides in providing a centrifugal clutch construction which ensures a smooth engagement and disengagement by avoiding the occurrence of shocks during operation of the centrifugal clutch.

According to advantageous features of the present invention, the centrifugal weight, in its free-wheel position, has a predetermined play in the rotational directions relative to a driver and is displaceable in intermediate positions in which it is in a torque-transmitting connection with the other clutch half, with a frictional contact, but with its other clutch half exclusively held in contact by the spring means which are mounted on the centrifugal weight independently of the driver.

Often, the clutch half subjected to the driving torque is required to exhibit a different torque curve during a deceleration phase relative to the other clutch half than during its acceleration phase. For this purpose, according to the present invention, the spring means have different spring characteristics in the two rotational directions for intermediate positions. Thus, for example, more springs or a greater spring force can act in one rotational direction than in the other rotational direction.

To provide a simple solution for achieving different spring characteristics, according to another advantageous feature of the present invention, the spring means have different effective spring travels or paths for intermediate positions in the two rotational directions.

To produce a torque-dependent support for the compressive force exerted by the centrifugal weight while avoiding an abrupt initiation of the frictional connection, according to the present invention, at least one centrifugal weight, held by a spring means against one clutch half in a free-wheel position so as to permit mutual relative rotation of both clutch halves, has at least one engagement surface cooperating with a corresponding engagement surface associated with the one clutch half so as to derive a servo-force component, at right angles to the rotational axis, from the torque of such clutch half. A centrifugal weight, held in a free-wheel position by the spring means, upon overcoming a pretensioning force of the spring means under the influence of centrifugal force, is displaceable into an engaged position in which both the engagement surfaces for the servo-force components are engaged with one another and the centrifugal weight is brought into frictional contact with the other clutch half. The corresponding engagement surfaces have a play with respect to one another for the servo-force components in the rotational directions of the clutch axis when the centrifugal weight is in its free-wheel position. The centrifugal weight is displaceable into intermediate positions in which it is indeed in frictional contact with the other clutch half, but is in a torque-transmitting connection with its clutch half exclusively by way of spring means fastened to the centrifugal weight and the clutch half independently of engagement surfaces.

The clutch according to the present invention operates in such a manner that the driving torque from one clutch half to the other clutch half can change, and a servo-action is achieved in both load cases. For this purpose, separate corresponding engagement surfaces are provided for each rotational direction.

In order to set the transferable torque at different levels for the two load cases, according to a further advantageous feature of the present invention, the servo-force components in the two rotational directions are of different magnitudes.

Often it may be desirable to reduce the transferable torque when the driving torque to the other clutch half is changing. For this purpose, according to the present invention, the servo-force components are directed centripetally to one rotational direction.

On the basis of the torque-transmitting function of the spring means, the drive shell in the above-identified two proposed clutch constructions ensures a purely proportional dependence on the compressive force of the centrifugal weight upon the centrifugal force. This can be eliminated and/or can cooperate with the engagement surface of the centrifugal weight for the servo-force component in the clutch construction of the present invention by providing a driver which cooperates with engagement surfaces of the centrifugal weight for the servo-force component.

In accordance with a still further feature of the present invention, in order to facilitate the construction of an essentially closed annular clutch housing, advantageously the clutch half which anchors the centrifugal weight has a U-shaped ring with the centrifugal weight being disposed between the two legs of the U-shaped ring.

Moreover, to maintain the supporting forces of the drive shell advantageously low, in accordance with the present invention, a drive pin may be disposed so that an axis thereof extends parallel to the clutch axis with the drive pin being supported at its ends in the respective legs of the U-shaped ring.

In proposed centrifugal clutch constructions operating without servo-support for the centrifugal weights, recesses for engagement of the drive shells pass completely through the centrifugal weight. A disadvantage of such a construction resides in the fact that the mass of the weight is reduced in an undesirable manner. This disadvantage is avoided in the centrifugal clutch in accordance with the present invention by providing a ring sector element with cylindrical inside shell surfaces which ring sector element operates as a centrifugal weight and with the driver cooperating with an engagement surface of a recess proceeding outwardly from an inner sleeve surface which recess completely interrupts the inner sleeve surface but is closed with respect to an outer sleeve surface of the ring sector element.

In order to provide for an independence of the spring means for anchoring the centrifugal weights, as far as the number and arrangement of the spring means are concerned, in accordance with yet another feature of the present invention, the ring sector element has at least one additional recess proceeding out from the outer sleeve surface for the mounting of the spring means.

To attain an advantageous featuring of the spring means to its associated clutch half in the centrifugal clutch according to the present invention, the spring means are tensioned against the bottom of a recess by a spring plate which functions as a hold-down which plate is mounted in corresponding recesses of the legs of the U-shaped ring.

Moreover, the fastening of the spring means may be in the form of a bayonet-type quick connection. For this purpose, the spring plate operating as a hold-down for the spring means is delimited in the directions of a first plate axis which extends at right angles to the spring axis by two end surfaces. The two end surfaces have a mutual distance which is at least equal to the mutual distance between the legs of the U-shaped ring. In the direction of a second plate axis, at right angles to the spring axis and at least approximately perpendicular to the first plate axis, two mutually diametrically opposite mounting tabs are provided with free ends of the tabs having a larger mutual spacing than the legs of the U-shaped ring.

If a hydrodynamic drive is incorporated in a torque transfer train between a driving motor or engine and the wheels of a vehicle, especially a hydrodynamic converter, the hydrodynamic drive operates only in a starting phase of the motor vehicle while the centrifugal clutch bypasses the hydrodynamic drive under normal operating conditions. For this reason, it is advantageous to be able to control the centrifugal clutch from the driver's seat. For this purpose, according to the present invention, the clutch half which anchors the centrifugal weight is connected to a section of the torque transfer train which is coupled to the vehicle wheels.

In order not to limit the conversion range when bypassing a hydrodydnamic drive, according to the present invention, the engagement rpm of the clutch half which anchors the centrifugal weight, when the centrifugal weight is in frictional contact with the other clutch half, is approximately half as great as its synchronous rpm at which the other clutch half is driven in a slip-free manner.

If a D.C. shunt motor driving a starting converter is utilized as a drive for a vehicle, a converter drive with turbine rpm values above the essentially constant rated motor rpm would be unnecessarily detrimental to the overall performance because of the internal converter losses. To avoid this disadvantage, according to the present invention, the synchronous rpm of the clutch half which anchors the centrifugal weight is at least as high as the rated rpm of the D.C. shunt motor.

In a D.C. shunt motor driving a converter, it is desirable to adjust the engagement rpm of the centrifugal clutch, serving as a bypass, to be relatively close to the rated rpm of the motor to utilize the complete conversion range. However, in a centrifugal clutch operating without servo-support for its centrifugal weights, this would result in very high slip losses because the curve of the transferable clutch moment is quite remote from the rated point of the motor. In a centrifugal clutch operating with continuous servo-support, there would be the danger that the permissible switching torque might be exceeded if the battery voltage driving the motor were to be reduced. This problem could be solved by setting the engagement rpm of the centrifugal clutch closer to the rated motor rpm. However, this approach would result in the centrifugal weights having greater masses and, consequently, it would be necessary to make the spring seats of the centrifugal weights appropriate large. However, this solution cannot be employed in a centrifugal clutch mounted, for example, because of limited space available in a motor vehicle, together with the electric drive in a free annular space of the hydrodynamic converter due to the small cross section of such annular space.

In order to make it possible to set the engagement rpm slightly below the rated motor rpm and to set the synchronization rpm slightly above the rated motor rpm without the above-noted disadvantages, in accordance with still further features of the present invention, the perpendicular force of the centrifugal weight, which causes the frictional connection, is exclusively proportional to the centrifugal force in the rpm range between the engagement rpm and the clutch rpm at which the driver sleeve engages the centrifugal weight and is in the subsequent rpm range between the clutch rpm and the synchronous rpm, additionally dependent upon the torque of the clutch half which anchors the centrifugal weight.

When operating electric vehicles, in which a separately excited D.C. shunt motor with a large field adjustment range such as, for example, 1:6 to 1:8, and a low rated rpm is used in conjunction with a hydrodynamic starting clutch, it is advantageous to eliminate losses by combining the starting clutch with a centrifugal clutch according to the present invention. For this purpose, the turbine wheel of the starting clutch is connected with the clutch half which anchors the centrifugal weights and the pump wheel is connected with the clutch half of the centrifugal clutch of the present invention which can be brought into frictional contact with the centrifugal weights. In this manner, the torque transfer can be accomplished in the starting range in purely hydrodynamic fashion and in the main operating range in a purely mechanical fashion at which time the turbine rpm is greater than the rated motor rpm.

With a D.C. shunt motor which operates on a drive for a motor vehicle and which can be cut down from a rated rpm to a reduced rpm in a braking operation, and with one clutch half being coupled to the D.C. shunt motor and the other clutch half being connected to vehicle wheels, according to the present invention, a transition range, produced by down-shifting in a braking operation, is between a torque curve of the shunt motor during operation at the rated rpm and the torque curve when operated at reduced rpm with the engagement surface which produces the centripetal servo-force component for the centrifugal weight.

Accordingly, it is an object of the present invention to provide a centrifugal clutch arrangement which avoids, by simple means, the shortcomings and disadvantages encountered in the prior art.

Another object of the present invention resides in providing a centrifugal clutch arrangement which is simple in construction and, therefore, inexpensive to manufacture.

Yet another object of the present invention resides in providing a centrifugal clutch arrangement which functions reliably under all operating conditions.

A further object of the present invention resides in providing a centrifugal clutch arrangement in which engagement and disengagement of the clutch is effected in a smooth, shock-free manner.

These and other objects, features, and advantages of the present invention will become more apparent from the following description when taken in connection with the accompanying drawings, which show, for the purposes of illustration only, one embodiment of a centrifugal clutch arrangement for bypassing a hydrodynamic converter in accordance with the present invention, and wherein.

Figure 1:
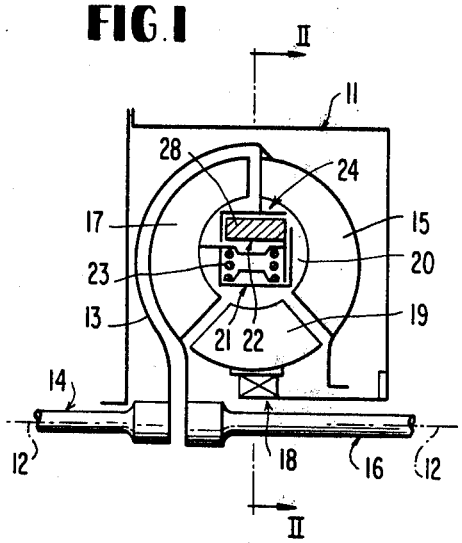
FIG. 1 is a schematic axial cross-sectional view through a hydrodynamic converter with a centrifugal clutch in accordance with the present invention disposed in a free annular space of the converter, in a plane containing the axis of rotation.
Figure 2:
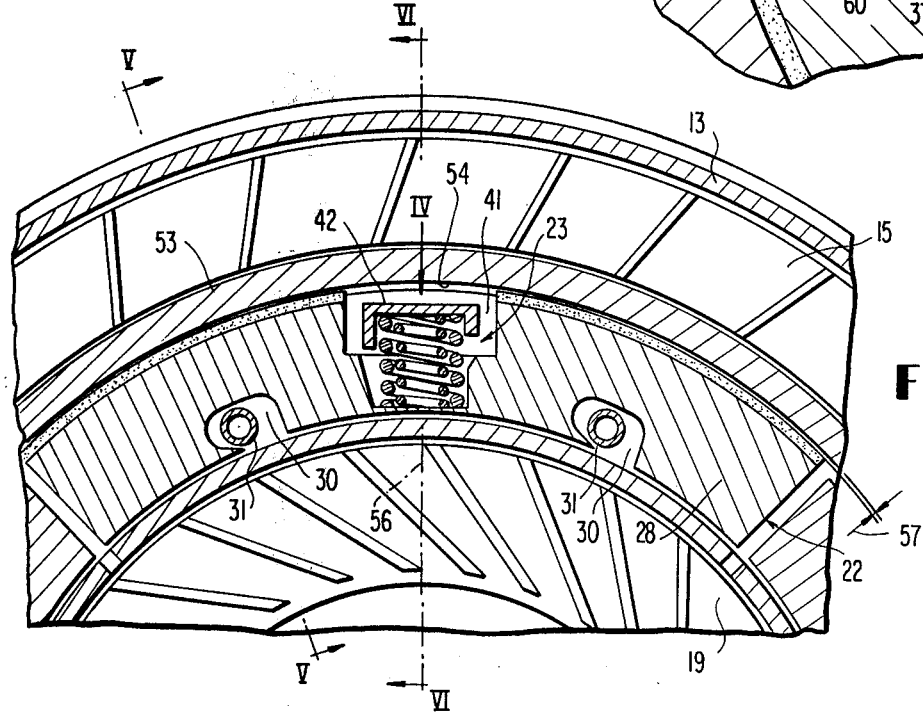
FIG. 2 is a partial cross-sectional view at right angles to the axis of rotation taken along line II—II in FIG. 1.
Figure 9:
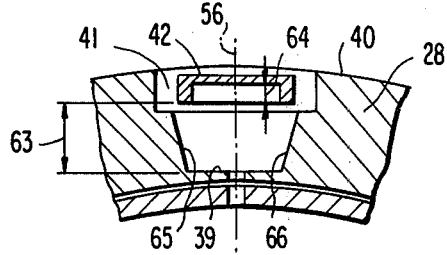
Figure 10:
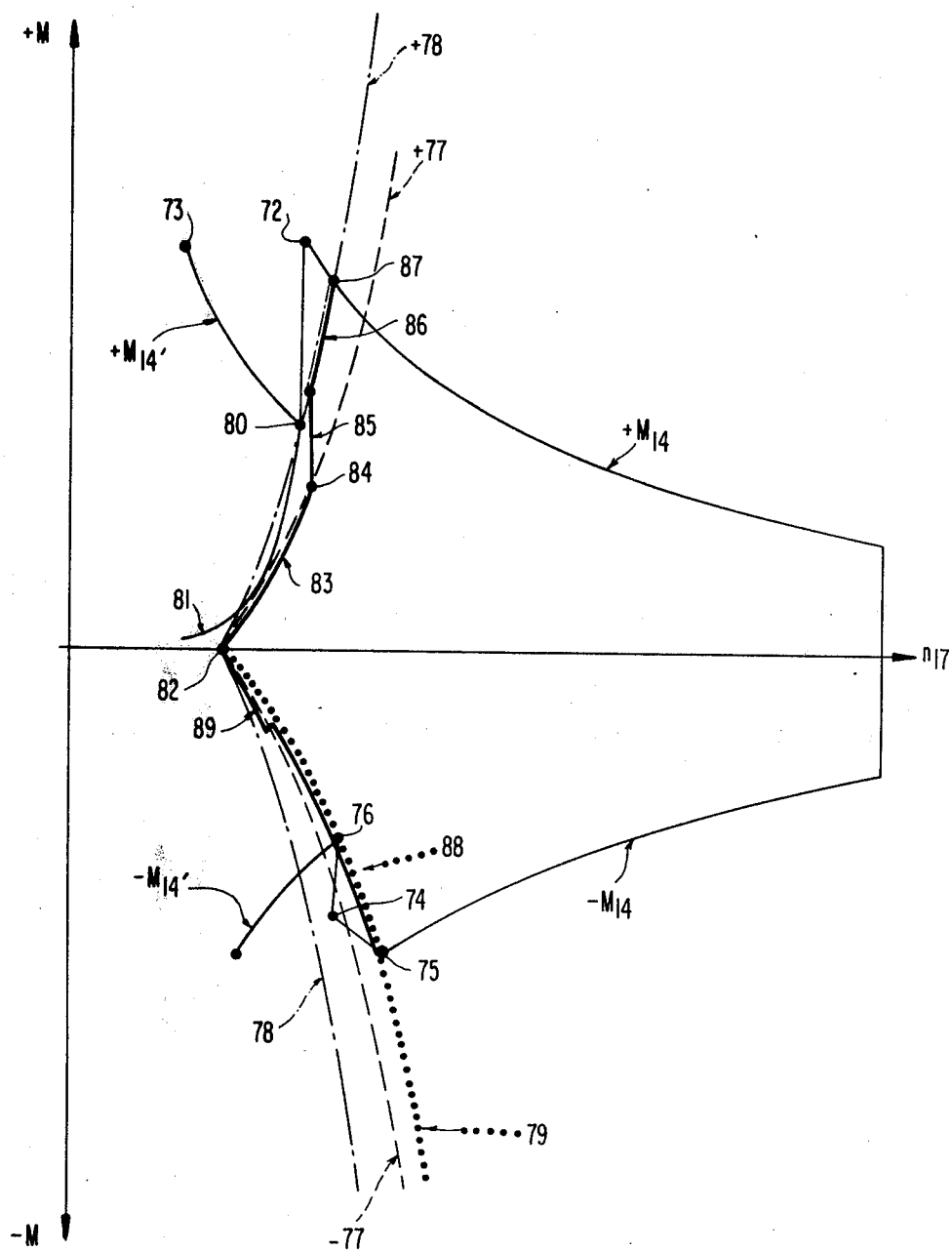

FIG. 9 is a partial cross-sectional view of the converter of FIG. 2 and illustrates a construction with a spring characteristic for the spring means anchoring the centrifugal weight which is symmetrical for two types of converter operation; and FIG. 10 is a graphic illustration of a curve of the torque which can be transmitted by the centrifugal clutch in accordance with the present invention and of the torque which can be delivered by a D.C. shunt motor connected to drive a power train with the converter in FIG. 1 as well as the turbine rpm of the converter.

Referring now to the drawings wherein like reference numerals are used throughout the various views to designate like parts and, more particularly to FIG. 1, according to this figure, a pump wheel 15 is non-rotatably connected to a circumferential housing part 13 which is provided with an input shaft generally designated by the reference numeral 14. A turbine wheel 17 is non-rotatably connected with an output shaft generally designated by the reference numeral 16 with a guide wheel 19 being attached to a converter housing generally designated by the reference numeral 11 by a conventional free-wheeling mechanism generally designated by the reference numeral 18. The guide wheel 19 is attached to the converter housing 11 so as to be rotatable in only one rotational direction. The pump wheel 15, turbine wheel 17, and guide wheel 19 are rotatably mounted in the fixed annular converter housing 11 and are disposed concentrically with respect to an axis of rotation 12.

When the converter is operating as a starting converter in a vehicle having an electric drive having the characteristics illustrated in FIG. 10, the input shaft 14 is driven by a D.C. shunt motor while the output shaft 16 is coupled to the wheels of a vehicle through, for example, an appropriate, conventional gear box.

The centrifugal clutch of the present invention is mounted in an annular inner chamber 20 of the converter in such a manner that one clutch half generally designated by the reference numeral 21, to which centrifugal weights 22 are anchored by means of springs 23, is non-rotatably connected with the turbine wheel 17 while the other clutch half generally designated by the reference numeral 24 is non-rotatably connected to the pump wheel 15. The second clutch half 24 is frictionally connected to the centrifugal weights 22.

Figure 5:
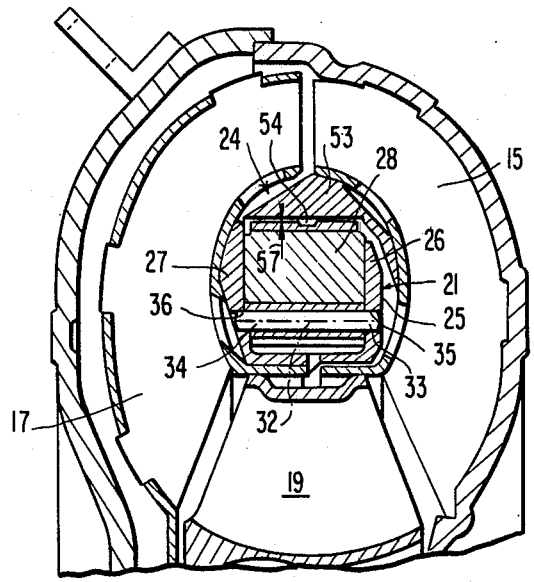
FIG. 5 is an axial cross-sectional view through the converter of FIG. 1 taken in the plane along the line V—V in FIG. 2, which plane contains the axis of rotation as well as the axis of a drive pin.

As shown most clearly in FIG. 5, the clutch half 21 includes a U-shaped ring 25 having legs 26, 27. Ring sector elements 28, preferably four in number, are disposed between the legs 26, 27 and function as centrifugal weights.

Figure 3:
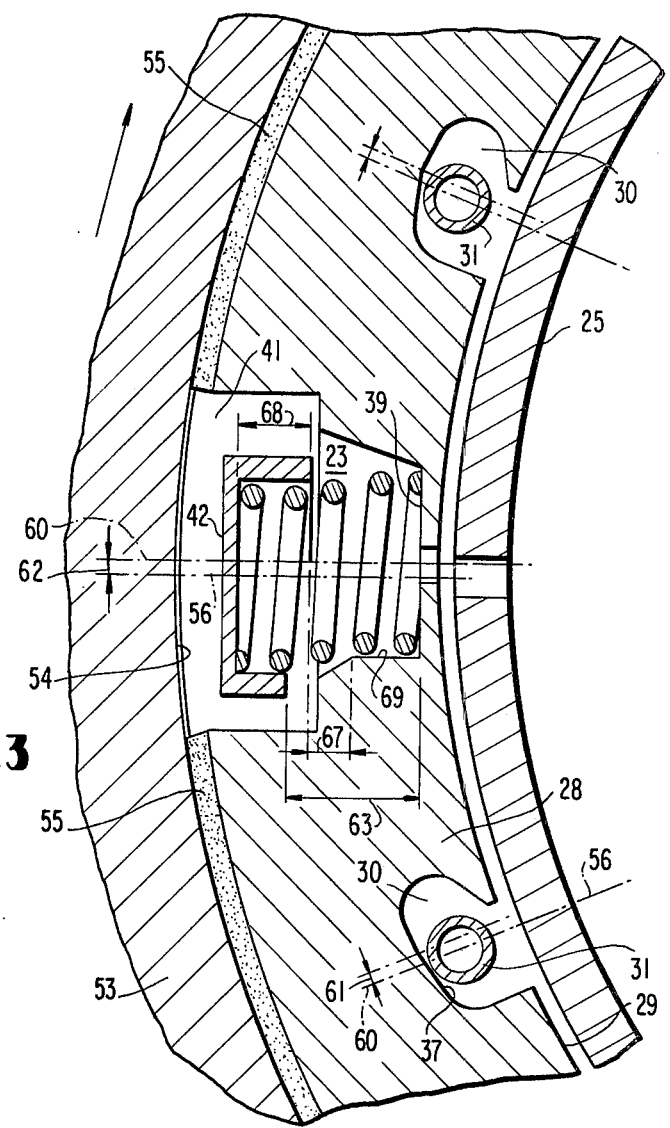
FIG. 3 is a partial cross-sectional view corresponding to FIG. 2, illustrating an intermediate position of a centrifugal weight in the clutch arrangement in accordance with the present invention.
Figure 7:
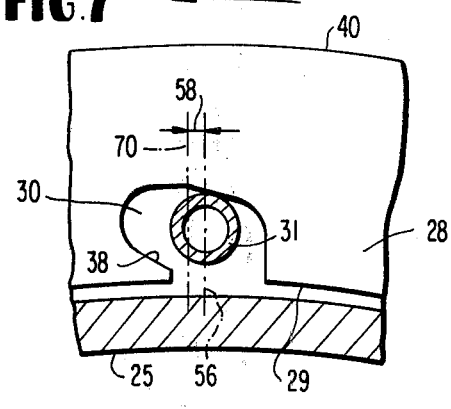
FIG. 7 is a partial cross-sectional view of a converter corresponding to FIG. 2 and illustrating the engaged position of the centrifugal weight when the converter is operating under a load.
Figure 8:
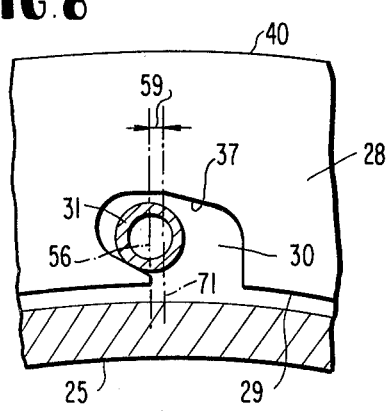
FIG. 8 is a partial cross-sectional view through the converter corresponding to FIG. 2 and illustrates an engaged position of the centrifugal weight when the converter is being braked.

As shown most clearly in FIGS. 3, 7, and 8, the ring sector element 28 has two recesses 30 originating in its cylindrical inner shell 29 with each recess 30 being traversed by a shell 31 operating in the manner of a roller bearing. The shell 31 is rotatably mounted on a drive pin (FIG. 5) with the ends 33, 34 of the drive pin 32 being each mounted in a corresponding bearing opening 35 and/or 36 of an adjacent leg 26 and/or 27.

The recess 30, as shown in FIG. 8, provides an engaging surface 37 to engage the drive pin 32 and/or its associated shell 31 to derive a centrifugal servo-force component intensifying the compressive force on the centrifugal weight for operation of the converter under load from the torque of the output shaft 16. For a braking operation of the converter, the recess 30 is provided with an engaging surface 38 (FIG. 7) to derive a centripetal servo-force component which reduces the compressive force on the centrifugal weight.

Spring means 23, with its inner end, radially with respect to rotational axis 12—12, abuts a bottom 39 (FIGS. 3 and 9) of a recess 41. The recess 41 is located in the circumferential direction between recesses 30 and proceeds outward from a cylindrical outer sleeve 40 of the ring sector element 28. The radial outer end of the spring means 23 is tensioned against a spring plate 42.

Figure 4:
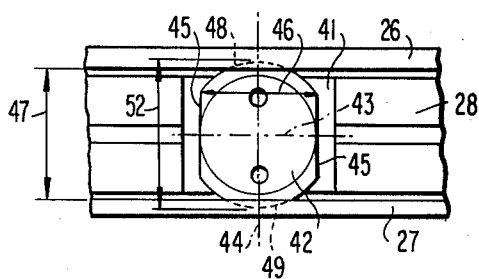
FIG. 4 is a top view of a spring mount taken in the direction of the arrow IV in FIG. 2.

As shown in FIG. 4, the spring plate 42 has two mutually perpendicular reference axes 43, 44. The spring plate 42 is delimited by two end surfaces 45 in the directions of the reference axis 43 with the mutual distance between the end surfaces 45 being less than the distance 47 between legs 26 and 27. The spring plate 42, in the directions of the reference axis 44, is provided at its corresponding ends with mounting tabs 48 and 49 (FIG. 4). Each of the mounting tabs 48 fits into a corresponding recess 50 and/or 51 (FIG. 6) of the adjacent legs 26 and/or 27. The mutual distance 52 between the outer ends of the mounting tabs 48 and 49 is greater than the distance 47 between the legs 26, 27. In this manner, the spring plates 42, with the reference axis 44 parallel to the legs 26, 27, can be guided into the recesses 41 and fitted into recesses 50, 51 by rotating the spring plates 42 bayonet-wise through 90° with mounting tabs 48, 49.

The other clutch half 24 is provided with a ring 53 having an L-shaped cross section. The ring 53 fits over legs 26 and 27 and is provided with an internal cylindrical frictional surface 54 which cooperates with frictional coatings or linings 55 provided on the outside sleeve 40 of the ring sector element 28.

As shown in FIGS. 2, 4, 5, and 9, the ring sector element 28 is held by the spring means 23 in a free-wheel position 56 relative to the clutch half 21, in which position the frictional coatings or linings 55 are separated from the frictional surface 54 by a radial play 57. In circumferential directions of rotational axes 12—12, engagement surfaces 37, as shown in FIG. 7, have a predetermined play 58 and engagement surfaces 38, as shown in FIG. 8, have a predetermined play 59 relative to the drive pin 32 and/or the sleeve 41 when the ring sector element is in the free-wheel position 56. In this manner, the ring sector element 28, when its centrifugal force overcomes the pretensioning force of the spring means 23, is in the intermediate positions 60 (FIG. 2). In the intermediate positions 60, the coatings or linings 55 of the ring sector element 28 are in frictional contact with frictional surface 54; however, the corresponding engagement surfaces, for example, surfaces 37 in FIG. 3 for the operation of the converter under load, for the servo-force component are still not in mesh with the drive pin and/or its associated shell 30 since the play 61 between free-wheel position 56 and intermediate position 60 is always less than or smaller than the play 58 and/or 59. Consequently, a torque is transmitted between clutch halves 21 and 24 in intermediate positions 60 exclusively by way of spring means 23 as is evident from the deflection 62 shown in FIG. 3.

Figure 6:
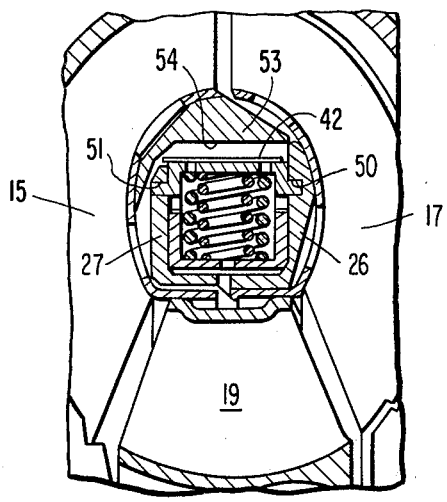
FIG. 6 is an axial cross-sectional view through the converter of FIG. 1 taken in a plane extending along the line VI—VI in FIG. 2, which plane contains the axis of rotation and the spring axis of a spring fastener.

For the sake of clarity, only a broad outer spring is illustrated in FIG. 3; however, the spring means 23 may consist of two coil springs mounted concentrically with respect to one another in a manner shown most clearly in FIGS. 2 and 6.

FIG. 9 provides an example of the construction or configuration of the tensioning points for the ends of the spring means 23 which enable the production of relatively large effective spring travel 63, which travel does not change during a shift between operation of the converter under load and during braking. This may be accomplished on the one hand by a short tensioning length 64 of equal length for both operating states at the spring plate 42 and, on the other hand, by a short tensioning length of equal length for both operating states due to the provision of inclined wall segments 65, 66 of the recess 41 on the ring sector element 21 or by both measures simultaneously.

To achieve a harder spring characteristic under a load than under an operation for braking, as shown in FIG. 3, the tensioning points for the ends of the spring means 23 may be constructed or configured so that a shorter effective spring travel path 67 relative to the greater spring travel path 63 is provided for operation during braking. On the one hand, the shortening of the spring travel path can be accomplished by a greater tensioning length 68 on the spring plate 42 and, on the other hand, by a greater tensioning length due to the spring-axis-parallel wall segment 69 of the recess 41 or by both measures simultaneously.

As the centrifugal force increases and the compressive force increases as well, the ring sector element 28, while maintaining its frictional connection with its frictional coatings or linings 55 against frictional surface 54 is displaced relative to its clutch half 21 (U-ring 25) when the converter is operating under load to a clutch position 70 (FIG. 7) and to a clutch position 71 (FIG. 8) when the converter is being braked.

In the engaged position, the drive pin 32 engages engagement surface 37 of the centrifugal weight 22 by means of the shell 31, so that the compressive force, resulting from the centrifugal force, is superimposed upon a centrifugal servo-force component derived from the torque of the clutch half 21. On the other hand, drive pin 32 and/or its associated shell 31, in the clutch position 71, is engaged with engagement surface 38 so that the compressive force which depends upon the centrifugal force is superimposed upon a centripetal servo-force component derived from the torque of the clutch half 21.

In this manner, the transferable torque of the centrifugal clutch is increased when operating under load and decreased when braking.

In the illustrative diagram of FIG. 10, the turbine rpm $n_{17}$ of the turbine wheel is plotted as the abscissa. The positive segment +M of the ordinate corresponds to the operation under a load while the negative segment −M corresponds to braking of the converter of FIG. 1. Input shaft 14 is assumed driven by a D.C. shunt motor. The curve generally designated by the reference character +$M_{14}$ represents a curve of the torque of the input shaft 14 when the D.C. shunt motor is running at its rated rpm designated by the curve point 72 with the converter under load. By reducing the D.C. voltage, the D.C. shunt motor can be cut back to approximately half its rated rpm designated by the curve point 73. The corresponding curve of the torque for the input shaft 14 is represented by the curve generally designated by the reference character +$M_{14'}$.

The two curves for the torque of the input shaft 14, corresponding to an operation while braking, are represented by the curves generally designated by the reference characters −$M_{14}$ and −$M_{14'}$ between which there is a kinked or crimped transition area generally designated by the reference numeral 74 with curve end points 75 and 76 produced by the control technique employed.

The curves generally designated by the reference numerals +77 and −77, indicated in dashed lines, represent the curve of the torque which can be transmitted by the centrifugal clutch according to the invention when operating under load and when braking, when the centrifugal weight 22 is in the intermediate positions 60, that is, when the compressive force of the centrifugal weight 22 is exclusively proportional to the centrifugal force.

The curves generally designated by the reference numerals +78 and −78, shown by dot-dashed lines, represent the curve of the torque which can be transmitted by the centrifugal clutch according to the present invention when operating under load and when braking, when drive pins 32 generating centrifugal servo-force components in both rotational directions.

The curve generally designated by the reference numeral −79, shown as a dotted line, represents the curve of the torque which can be transmitted by the centrifugal clutch according to the present invention during a braking operation, when drive pin 32 and/or its associated shell 31, cooperating with engagement surface 38, generates a centripetal servo-force component on centrifugal weight 22, that is, it reduces the compressive force resulting from the centrifugal force.

The curve generally designated by the reference numeral 81, whose path was determined by a curve minimum designated by the curve point 80 of the torque curve +$M_{14'}$, represents the curve of the permissible shifting moment which must not be exceeded by the torque which can be transmitted by the centrifugal clutch in order to avoid a jerking when shifting in the power train which includes the input shaft 14 and output shaft 16.

The pretensioning force of the spring means 23 is so selected that the engagement rpm represented by the curve point 82, at which the centrifugal force of the centrifugal weight 22 overcomes the pretensioning force, is slightly more than 50% of the rated rpm 72 of the D.C. shunt motor. In this manner, the complete conversion range of the converter is retained. With an increasing turbine rpm $M_{17}$, centrifugal weight 22 is in the intermediate positions 60, so that the spring means 23 alone particulate in the torque transmission and the transmittable torque of the clutch follows the section 83 of the curve +77 when operating under a load.

When the centrifugal weight 22, at a clutch rpm designated by the curve point 84, reaches its engagement position 70, its compressive force is intensified by the drive pin 32 and the transmittable torque of the centrifugal clutch according to the present invention passes through a transition ring 85 corresponding to the curve section 86 of the curve +78. In this manner, the synchronous rpm represented by the curve point 87, above which the two clutch halves 21 and 24 rotate without slip, is close or near to the rated rpm 72 of the D.C. shunt motor.

For braking, spring means 23 are constructed so as to be softer or have a greater effective spring travel 63 whereby the torque which can be transmitted by the centrifugal clutch according to the present invention in the transition range 74 corresponding to curve segment generally designated by the reference numeral 88 of the curve 79 is between the curve end points 75 and 76, to avoid jerks when shifting in the power train of the input shaft 14 and output shaft 16.

When the turbine rpm $n_{17}$ is dropping to the engagement rpm 82, during a braking operation, the curve of the torque transmittable by the centrifugal clutch according to the invention merges into the curve segment 89 of the curve −77, at which only the spring means 23 transmits torque. In this manner, gentle engagement of frictional contact between the clutch halves 21 and 24 is ensured even during braking.

While I have shown and described only one embodiment in accordance with the present invention, it is understood that the same is not limited thereto, but is susceptible of numerous changes and modifications as known to one having ordinary skill in the art, and I therefore do not wish to be limited to the details shown and described herein, but intend to cover all such changes and modifications as are encompassed by the scope of the appended claims.

I claim:

1. A centrifugal clutch which includes a first and second clutch half, at least one centrifugal weight, spring means for locking the at least one centrifugal weight to one of the clutch halves in a free-wheel position so as to permit relative rotation between the first and second clutch halves, at least one driver means provided in one of the clutch halves for driving the at least one centrifugal weight in two rotational directions about an axis of rotation of the centrifugal clutch, the at least one centrifugal weight being mounted in one of the clutch halves so that under the influence of centrifugal force, upon overcoming a pretensioning force of the spring means, the centrifugal weight moves from the free-wheel position to an engaged position wherein the at least one centrifugal weight is in mesh with both the driver means and in frictional contact with the second clutch half, characterized in that in the free-wheel position the centrifugal weight has a predetermined play in the two rotational directions relative to the driver means, the centrifugal weight is displaceable into intermediate positions in which is established a torque-transmitting connection between the clutch halves by way of a frictional contact, and in that the spring means are mounted on the centrifugal weight so as to exclusively hold the clutch halves in contact independently of the driver means in the intermediate positions.

2. A centrifugal clutch according to claim 1, characterized in that the spring means are constructed so as to have different spring characteristics for the intermediate positions in the two rotational directions.

3. A centrifugal clutch according to claim 2, characterized in that the spring means have different spring travel paths for the intermediate positions in the two rotational directions.

4. A centrifugal clutch according to one of claims 1, 2, or 3, wherein the at least one centrifugal weight has at least one engagement surface cooperable with a corresponding engagement surface associated with the second clutch half so as to derive a servo-force component, which acts at right angles to the axis of rotation of the centrifugal clutch, from a torque of the first clutch half, and wherein, in the engaged position, both engagement surfaces for the servo-force components are engaged with one another and the at least one centrifugal weight is brought into frictional contact with the second clutch half, characterized in that the engagement surfaces for the servo-force components have a predetermined play with respect to one another in circumferential directions about the axis of rotation of the centrifugal clutch when the at least one centrifugal weight is in the free-wheel position, in that the at least one centrifugal weight is in frictional contact with the second clutch half when the at least one centrifugal weight is displaced into the intermediate positions with the torque-transmitting connection between the clutch halves being exclusively by the spring means, and in that the spring means is mounted on the at least one centrifugal weight and the first clutch half independently of the engagement surfaces.

5. A centrifugal clutch according to claim 4, characterized in that separate engagement surfaces are provided on the at least one centrifugal weight and the second clutch half for each rotational direction.

6. A centrifugal clutch according to claim 5, characterized in that the servo-force components derived by the engagement surfaces in the two rotational directions are of different magnitudes.

7. A centrifugal clutch according to claim 6, characterized in that at least one of the engagement surfaces is arranged so that the servo-force components in one rotational direction are directed centripetally.

8. A centrifugal clutch according to claim 7, characterized in that the driver means is cooperable with the engagement surface of the at least one centrifugal weight so as to derive the servo-force component.

9. A centrifugal clutch according to claim 8, characterized in that the at least one centrifugal weight is arranged in the first clutch half, and in that a U-shaped ring is mounted in the first clutch half, the U-shaped ring includes two spaced legs between which the at least one centrifugal weight is disposed.

10. A centrifugal clutch according to claim 9, wherein the drive means includes a drive pin disposed with a longitudinal axis thereof extending parallel to the axis of rotation of the centrifugal clutch, characterized in that respective ends of the drive pin are supported in the legs of the U-shaped ring.

11. A centrifugal clutch according to claim 10, characterized in that the at least one centrifugal weight is constructed as a ring sector element having a radially inner and a radially outer cylindrical shell surface, at least one recess is provided and proceeds radially outwardly from the inner shell surface, the driver means being cooperable with an engagement surface of the at least one recess, and in that the at least one recess completely interrupts the inner shell surface but is closed with respect to the outer shell surface of the ring sector element.

12. A centrifugal clutch according to claim 11, characterized in that at least one additional recess for mounting the spring means is provided in the ring sector element, said at least one additional recess proceeding radially inwardly from the outer shell surface of the ring sector element.

13. A centrifugal clutch according to claim 12, characterized in that the at least one additional recess is provided with a bottom wall, and in that the spring means are supported directly on the bottom wall of the additional recess.

14. A centrifugal clutch according to claim 13, characterized in that a spring plate means is provided for tensioning the spring means against the bottom wall of the at least one additional recess so as to operate as a hold-down, and in that recess means are provided in the legs of the U-shaped ring for accommodating said spring plate means.

15. A centrifugal clutch according to claim 14, characterized in that the spring plate means, in a direction of a first plate means axis extending at right angles to an axis of the spring means, is delimited by two ends surfaces having a mutual distance which is at least equal to a mutual spacing between the legs of the U-shaped ring, and in that the spring plate means, in a direction of a second plate means axis at right angles to the spring axis and at least approximately perpendicular to the first plate means axis, is provided with two mutually diametrally opposite mounting tabs, the mounting tabs including free ends having a larger mutual spacing than the mutual spacing between the legs of the U-shaped ring.

16. A centrifugal clutch according to claim 15, arranged in a vehicle having a driving motor, vehicle wheels, and a torque-transfer train between the driving motor and vehicle wheels, the torque-driving train including a hydrodynamic converter, the centrifugal clutch being arranged to bypass the hydrodynamic converter, characterized in that the first clutch half in which the at least one centrifugal weight is arranged is connected to a section of the torque transfer train coupled to the vehicle wheels.

17. A centrifugal clutch according to claim 16, characterized in that an engagement rpm of the first clutch half in which is arranged the at least one centrifugal weight, when the at least one centrifugal weight is in frictional contact with the second clutch half, is approximately half as great as a synchronous rpm at which the second clutch half is driven in a slip-free manner.

18. A centrifugal clutch according to claim 17, wherein the driving motor is a D.C. shunt motor, characterized in that the synchronous rpm of the first clutch half is at least as high as a rated rpm of the D.C. shunt motor.

19. A centrifugal clutch according to claim 18, characterized in that a perpendicular force of the at least one centrifugal weight causes the frictional contact with the second clutch half, the perpendicular force is excusively proportional to the centrifugal force in an rpm range between an engagement rpm and a clutch rpm at which the driver means engages the at least one centrifugal weight, and in that in a subsequent rpm range between the clutch rpm and the synchronous rpm, the prependicular force is additionally dependent upon a torque of the first clutch half.

20. A centrifugal clutch according to claim 19, characterized in that one of the clutch halves is coupled to the D.C. shunt motor, the D.C. shunt motor is operable so as to be cut down from a rated rpm to a reduced rpm during a braking operation, and the other clutch half is connected to the vehicle wheels, and in that the driver means, in a transition range produced by a down-shifting in the braking operation, is between a torque curve of the D.C. shunt motor during an operation at the rated rpm and a torque curve produced when the motor is operated at the reduced rpm with the engagement surface which produces the centripetal servo-force component for the at least one centrifugal weight.

21. A centrifugal clutch according to claim 1, characterized in that the at least one centrifugal weight is arranged in the first clutch half, and in that a U-shaped ring is mounted in the first clutch half, the U-shaped ring including two spaced legs between which the at least one centrifugal weight is disposed.

22. A centrifugal clutch according to claim 21, wherein the drive means includes a drive pin disposed with a longitudinal axis thereof extending parallel to the axis of rotation of the centrifugal clutch, characterized in that the respective ends of the drive pin are supported in the legs of the U-shaped ring.

23. A centrifugal clutch according to claim 22, characterized in that the at least one cylindrical weight is constructed as a ring sector element having an inner and outer cylindrical shell surface, at least one recess is provided and proceeds radially outwardly from the inner shell surface, the drive pin being engageable with an engagement surface of the at least one recess, and in that the at least one recess completely interrupts the inner shell surface but is closed with respect to the other shell surface of the ring sector element.

24. A centrifugal clutch according to claim 23, characterized in that at least one additional recess for mounting the spring means is provided, said at least one additional recess proceeds radially inwardly from the outer shell surface of the ring sector element.

25. A centrifugal clutch according to claim 24, characterized in that the at least one additional recess is provided with a bottom wall, and in that the spring means are supported directly on the bottom wall of the additional recess.

26. A centrifugal clutch according to claim 25, characterized in that a spring plate means is provided for tensioning the spring means against the bottom wall of the at least one additional recess and for operating as a hold-down, and in that recess means are provided in the legs of the U-shaped ring for accommodating said spring plate means.

27. A centrifugal clutch according to claim 1, arranged in a vehicle having a drive motor, vehicle wheels, and a torque transfer train between the drive motor and vehicle wheels, the torque transfer train including an input shaft means, a hydrodynamic converter means, and an output shaft coupled to the vehicle wheels, the centrifugal clutch being arranged to bypass the hydrodynamic converter, characterized in that the at least one centrifugal weight is mounted on the first clutch half, and in that the first clutch half is connected to the output shaft means coupled to the vehicle wheels.

28. A centrifugal clutch according to claim 1, characterized in that the centrifugal weight is mounted on the first clutch half, and in that an engagement rpm of the first clutch half, when the at least one centrifugal weight is in frictional contact with the second clutch half, is approximately half as great as a synchronous rpm at which the second clutch half is driven in a slip-free manner.

29. A centrifugal clutch according to claim 1, arranged in a vehicle having a driving motor constructed as a D.C. shunt motor, characterized in that the centrifugal weight is mounted on the first clutch half, and in that a synchronous rpm of the first clutch half is at least as high as a rated rpm of the D.C. shunt motor.

30. A centrifugal clutch according to claim 1, characterized in that a perpendicular force of the at least one centrifugal weight causes the frictional contact with the second clutch half, the perpendicular force is exclusively proportional to the centrifugal force in an rpm range between an engagement rpm and a clutch rpm at which the driver means engages the at least one centrifugal weight, and in that in a subsequent rpm range between the clutch rpm and the synchronous rpm, the perpendicular force is additionally dependent upon a torque of the first clutch half.

31. A centrifugal clutch according to claim 1, arranged in a vehicle having a driving motor constructed as a D.C. shunt motor, vehicle wheels, and a torque transfer train for coupling the driving motor with the vehicle wheels, characterized in that one of the clutch halves is coupled to the D.C. shunt motor, the D.C. shunt motor is operable so as to be cut down from a rated rpm to a reduced rpm during a braking operation, the other clutch half is connected to the vehicle wheels, and in that the driver means, in a transition range produced by a down-shifting in the braking operation, is between a torque curve of the D.C. shunt motor during an operation at the rated rpm and a torque curve of the motor when operated at a predetermined reduced rpm.

32. A centrifugal clutch according to claim 1, wherein cooperable means are provided on the at least one centrifugal weight and the second clutch half for deriving a servo-force component which acts at right angles to the rotational axis of the centrifugal clutch from a torque of the first clutch half, and wherein, in the engaged position, the cooperable means for the servo-force components are engaged with one another and the at least one centrifugal weight is brought into frictional contact with the second clutch half, characterized in that the means for deriving the servo-force components have a predetermined play with respect to one another in a circumferential direction about the axis of rotation of the centrifugal clutch when the at least one centrifugal weight is in the free-wheel position, in that the centrifugal weight is in frictional contact with the second clutch half when the at least one centrifugal weight is displaced into the intermediate positions with the torque-transmitting connection between the clutch halves being exclusively by the spring means, and in that the spring means is mounted on the at least one centrifugal weight and the first clutch half independently of the cooperable means.

* * * * *